(12) United States Patent
Larmo et al.

(10) Patent No.: US 9,185,722 B2
(45) Date of Patent: Nov. 10, 2015

(54) CONTENTION BASED ACCESS OPTIMIZATION

(75) Inventors: Anna Larmo, Espoo (FI); Riikka Susitaival, Helsinki (FI); Stefan Henrik Andreas Wager, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 218 days.

(21) Appl. No.: 13/578,935

(22) PCT Filed: Feb. 15, 2010

(86) PCT No.: PCT/IB2010/000284
§ 371 (c)(1),
(2), (4) Date: Aug. 14, 2012

(87) PCT Pub. No.: WO2011/098849
PCT Pub. Date: Aug. 18, 2011

(65) Prior Publication Data
US 2012/0300744 A1    Nov. 29, 2012

(51) Int. Cl.
*H04W 72/14* (2009.01)
*H04W 72/12* (2009.01)
*H04W 24/10* (2009.01)
*H04W 28/06* (2009.01)

(52) U.S. Cl.
CPC .......... *H04W 72/1284* (2013.01); *H04W 24/10* (2013.01); *H04W 28/06* (2013.01); *H04W 72/1242* (2013.01)

(58) Field of Classification Search
CPC .................... H04W 72/1284; H04W 72/1242; H04W 28/06; H04W 24/10
USPC .......................... 370/328, 329, 252, 315, 338
See application file for complete search history.

(56) References Cited

U.S. PATENT DOCUMENTS 8,411,583 B2 * 4/2013 Chun et al. ..................... 370/252
2006/0092876 A1 * 5/2006 Kwak et al. .................... 370/329
(Continued)

FOREIGN PATENT DOCUMENTS

EP         002255476 B1 *  3/2009
WO         2009120120 A1   10/2009

OTHER PUBLICATIONS

3rd Generation Partnership Project. "Clearing of pending BSR." 3PPG TSG-RAN WG2 Meeting #60bis, R2-080152, Sevilla, Spain, Jan. 14-18, 2008.*

(Continued)

*Primary Examiner* — Andrew Lai
*Assistant Examiner* — Mahmudul Hasan
(74) *Attorney, Agent, or Firm* — Coats & Bennett, PLLC

(57) ABSTRACT

The mobile station described herein comprises a transmission buffer, a receiver, a transmitter, and a controller. The controller triggers a scheduling request and buffer status report when data enters the transmission buffer. When the receiver receives a contention-based scheduling grant allocating contention-based uplink resources, the transmitter transmits one or more data packets retrieved from the transmission buffer along with the buffer status report on the contention-based resources to the network station. If one or more data packets remain in the transmission buffer after transmission of the buffer status report on the contention-based resources, the controller maintains the pending status of the buffer status report and the corresponding scheduling request.

19 Claims, 4 Drawing Sheets

(56) References Cited

U.S. PATENT DOCUMENTS

| | | | |
|---|---|---|---|
| 2006/0114877 A1* | 6/2006 | Heo et al. | 370/342 |
| 2006/0114887 A1* | 6/2006 | Kashimoto | 370/352 |
| 2008/0146242 A1* | 6/2008 | Alanara et al. | 455/452.1 |
| 2009/0022077 A1* | 1/2009 | Lin et al. | 370/310 |
| 2009/0168920 A1* | 7/2009 | Chen | 375/295 |
| 2009/0213818 A1* | 8/2009 | Park et al. | 370/336 |
| 2009/0219951 A1* | 9/2009 | Chun et al. | 370/474 |
| 2009/0300457 A1* | 12/2009 | Kuo | 714/749 |
| 2009/0316586 A1* | 12/2009 | Yi et al. | 370/242 |
| 2009/0316593 A1* | 12/2009 | Wang et al. | 370/252 |
| 2009/0316637 A1* | 12/2009 | Yi et al. | 370/329 |
| 2010/0008236 A1 | 1/2010 | Zhang et al. | |
| 2010/0067460 A1* | 3/2010 | Hu et al. | 370/329 |
| 2010/0098011 A1* | 4/2010 | Pelletier et al. | 370/329 |
| 2010/0110895 A1* | 5/2010 | Wu | 370/241 |
| 2010/0115355 A1* | 5/2010 | Hsu | 714/726 |
| 2010/0135229 A1* | 6/2010 | Lohr et al. | 370/329 |
| 2010/0144364 A1* | 6/2010 | Umesh et al. | 455/452.1 |
| 2010/0202420 A1* | 8/2010 | Jersenius et al. | 370/337 |
| 2010/0322156 A1* | 12/2010 | Wu | 370/329 |
| 2011/0085566 A1* | 4/2011 | Bucknell et al. | 370/412 |
| 2011/0292895 A1* | 12/2011 | Wager et al. | 370/329 |

OTHER PUBLICATIONS

3rd Generation Partnership Project. "Clearing of pending BSR." 3PPG TSG-RAN WG2 Meeting #60bis, R2080152, Sevilla, Spain, Jan. 14-18, 2008.*

3rd Generation Partnership Project. "Cancellation of Scheduling Request." 3GPP TSG-RAN WG2 Meeting #65, R2-091240, Athens, Greece, Feb. 9-13, 2009.*

3rd Generation Partnership Project. "Workplan for 3G Long-Term Evolution Terminal Protocol Conformance Test Specifications—Status after RAN5#38." 3GPP TSG-RAN5 Meeting #38, R5-080636 Malaga, Spain, Jan. 28-Feb. 1, 2008.

3rd Generation Partnership Project. "Improvement of SR_COUNT Initialization." 3GPP TSG-RAN WG2 Meeting #67bis, R2-095840, Miyazaki, Japan, Oct. 12-16, 2009.

* cited by examiner

CONTENTION BASED ACCESS OPTIMIZATION

TECHNICAL FIELD

The present invention relates generally to uplink transmissions, and more particularly to resource scheduling for uplink transmissions in LTE systems.

BACKGROUND

In LTE systems, the base station dynamically allocates dedicated uplink resources to user terminals operating within the wireless network. The basic assumption is that uplink resources are allocated only when the user terminal has data to send. When the user terminal has data to send, it sends a Scheduling Request (SR) to the base station at the first opportunity to request resources for the uplink transmission and waits for a Scheduling Grant (SG). The base station dynamically allocates dedicated uplink resources to the requesting user terminal and sends an uplink Scheduling Grant (SG) to the user terminal identifying the allocated uplink resources. Buffer Status Reports (BSRs) are transmitted from the user terminals to the base station to provide information about buffer levels of the user terminal and to assist in the allocation of uplink resources.

The dynamic allocation of uplink resources can significantly increase the transmission efficiency so that uplink resources are not left unused if some of the user terminals have no data or only a small amount of data to send. In some scenarios, however, dedicated resource scheduling takes too long. For example, the user plane latency for scheduling uplink transmission on dedicated uplink resources is in the order of 11.5 ms due to uplink control channel cycle times, transmission times, and processing delays associated with the generation, transmission, and decoding of the SR and SG. The 3GPP LTE-Advanced target for user plane latency is 10 ms or less. Thus, there remains a need for improved resource scheduling processes to reduce the time required to access uplink resources.

SUMMARY

The present invention improves resource scheduling procedures by incorporating contention-based resource scheduling operations with existing dedicated resource scheduling operations. To reduce the impact of at least some of the reliability issues associated with contention-based transmissions, the present invention controls the status of a pending scheduling request after the transmission of data packets on contention-based uplink resources based on the status of a transmission buffer.

A mobile station according to one exemplary embodiment comprises a transmission buffer, a receiver, a transmitter, and a controller. The controller triggers a scheduling request and buffer status report when data enters the transmission buffer. When the receiver receives a contention-based scheduling grant that schedules contention-based uplink resources, the transmitter transmits one or more data packets retrieved from the transmission buffer along with the buffer status report on the contention-based resources to the network station. If one or more data packets remain in the transmission buffer after transmission of the buffer status report on the contention-based resources, the controller maintains the pending status of the buffer status report and the corresponding scheduling request. In so doing, the controller ensures that the network station will eventually be made aware of a need for uplink transmission resources for the remaining data (e.g., by the subsequent transmission of the pending scheduling request), even if the buffer status report transmitted on the contention-based resources is lost or otherwise not correctly received by the network station.

DETAILED DESCRIPTION

Figure 1:
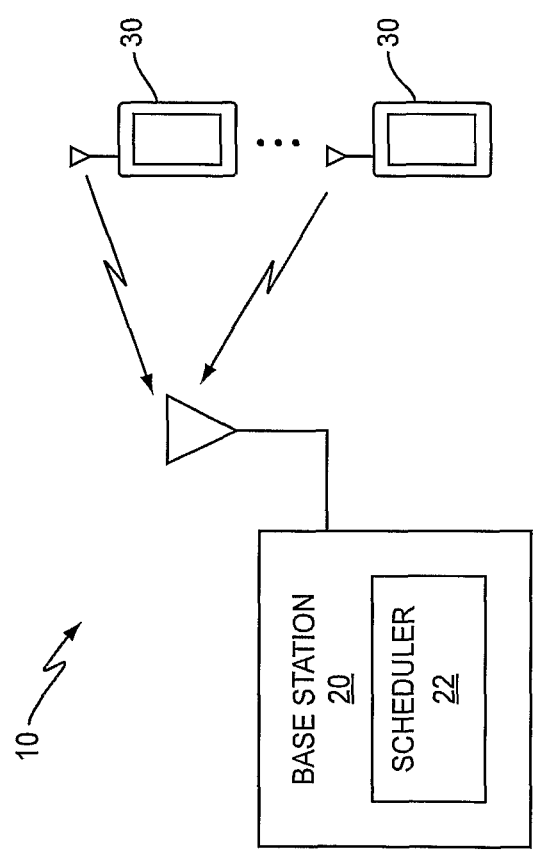
FIG. 1 illustrates an exemplary mobile communication system according to one embodiment of the invention.

Referring now to the drawings, FIG. 1 illustrates a mobile communication network 10 including a base station 20 and a plurality of user terminals 30. A scheduler 22 at the base station 20 coordinates the transmissions from the user terminals 30 to the base station 20 on the uplink. The scheduler 22 determines when the user terminals 30 are allowed to transmit on the uplink and allocates uplink resources to the user terminals 30. The scheduler 22 may allocate either dedicated resources or contention-based resources to the user terminal 30. Scheduling uplink resources is a function of the medium access control (MAC) layer in LTE systems. For illustrative purposes, the exemplary embodiment is described in the context an LTE system; however, those skilled in the art will appreciate that the present invention is applicable to communication systems using other standards now known or later developed where transmission on uplink resources are scheduled by the network.

LTE systems use a request-grant procedure for scheduling user terminals 30 on dedicated uplink resources. To briefly summarize, a user terminal 30 sends a scheduling request (SR) to the base station 20 at the first opportunity when the user terminal 30 has data to send. The scheduler 22 at the base station 20 allocates uplink resources to the user terminal 30 and sends a scheduling grant (SG) to the user terminal 30 that gives permission to the user terminal 30 to transmit data on the resources identified in the SG. Because the transmission buffers for the uplink are located at the user terminals 30, the user terminals 30 provide information about transmission buffer levels to the base station 20 by sending a buffer status report (BSR). A BSR is triggered when data arrives in the transmission buffer containing a higher priority than data already in the transmission buffer. A BSR can also be triggered when a predetermined period of time has elapsed since the last BSR, or when the serving cell for the user terminal 30 changes. The user plane latency for scheduling uplink transmission on dedicated uplink resources is in the order of 11.5 ms in the best case due to uplink control channel cycle times, transmission times, and processing delays associated with the generation, transmission, and decoding of the SR and SG.

In order to reduce the amount of time it takes to access uplink resources, a mechanism is also provided for contention-based access on uplink resources that have not been allocated to a specific user terminal 30 by the scheduler 22. There will be times when uplink resources are still available after allocating dedicated resources to the user terminals 30. When unallocated uplink resources are available, the base station 20 may allow all eligible user terminals 30 to send data on a contention basis without first requesting resources by sending a contention-based scheduling grant on a control channel to all user terminals 30. For example, time-aligned user terminals 30 that have data packets to transmit may use the resources allocated by the CBG to transmit the data packets.

Figure 2:
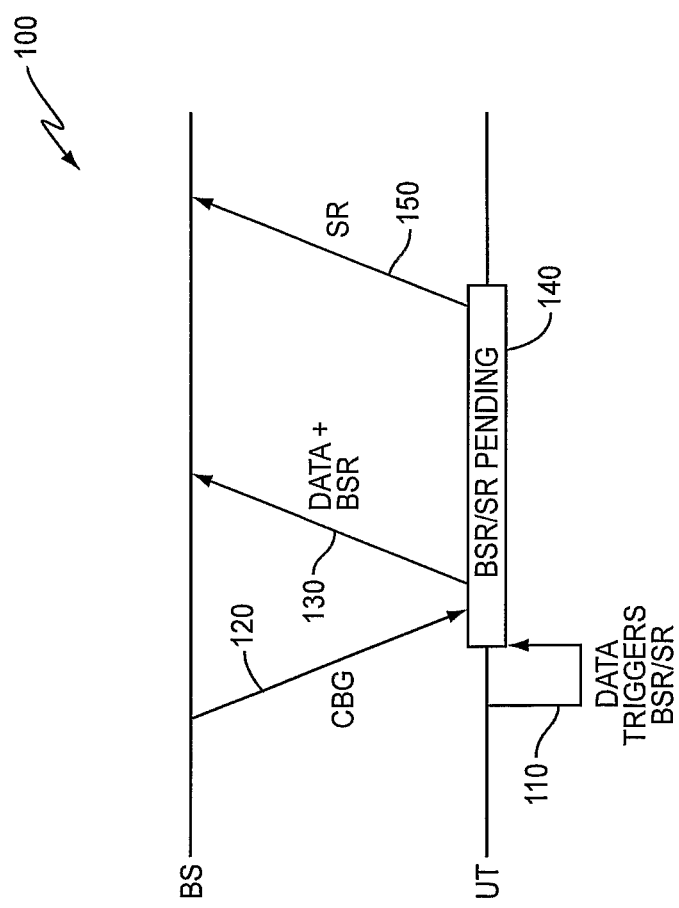
FIG. 2 illustrates one contention-based resource procedure according to one exemplary embodiment of the invention.

FIG. 2 illustrates an exemplary contention-based access procedure 100 for the uplink in a wireless communication system according to one exemplary embodiment of the present invention. In the scenario depicted in FIG. 2, data arriving at the transmit buffer of a user terminal 30 triggers a BSR and SR (110). While the BSR and SR are pending, the base station 20 sends a Contention-Based scheduling Grant (CBG) indicating that uplink resources are available (120). The base station 20 may, for example, transmit the CBG on the PDCCH. While the CBG is not addressed to a specific user terminal 30 and is not generated responsive to an SR, the CBG may use a Contention-Based Radio Network Temporary Identifier (CB-RNTI) to identify the CBG to the user terminals 30. The user terminals 30 may be made aware of the CB-RNTI as part of system broadcast information, or the CB-RNTI may be signaled to each user terminal 30 during connection setup. The CBG identifies the uplink resources available for contention-based access and may have the same format as a dedicated SG, e.g., may specify a modulating and coding scheme, transport format, etc., to be used for the contention-based uplink transmission. Alternatively, a new format could be defined to efficiently signal several CBGs. In any event, each user terminal 30 compatible with contention-based operations listens for both a CBG addressed to a CB-RNTI and an SG addressed to their dedicated C-RNTI. It will be appreciated that contention-based operations are backwards compatible as any user terminals 30 incompatible with contention-based operations will not decode the CBG addressed to a CB-RNTI.

Responsive to the CBG, the user terminal 30 transmits data retrieved from the transmission buffer on the uplink resources identified in the CBG and appends the BSR to one or more of the transmitted data packets (130). In contrast to transmissions on dedicated resources, the hybrid automatic repeat request (HARQ) retransmission protocol is typically not used for transmissions on contention-based resources. If the transmission buffer is emptied by the contention-based transmission, the BSR and SR may be cancelled. However, when data remains in the transmission buffer, it may be beneficial to keep the BSR and SR pending because transmissions on the contention-based resources are not as reliable as a scheduled transmission on dedicated resources. More particularly, data transmitted from different user terminals 30 on the same contention-based uplink resources may collide and at least some of the transmitted data is likely to be lost. Such transmission errors are particularly problematic when they result in the loss of the Buffer Status Report (BSR), which is generally used by the base station 20 to determine whether or not to schedule additional dedicated resources to one or more of the user terminals 30.

Because there is a possibility of collisions on the contention-based resources, the user terminal 30 cannot be certain that the BSR will be received. The present invention reduces the impact of such contention-based transmission errors by maintaining the pending status of the BSR, and therefore the pending status of the corresponding SR, when one or more data packets remain in a transmission buffer after the transmission of data packets on the contention-based resources (140). At the next opportunity, the user terminal 30 transmits the pending SR to the base station 20 (150). Maintaining the pending status of the BSR and SR when data packets remain in the transmission buffer, and subsequently sending the SR to the base station 20, speeds up the process of receiving a dedicated SG at the user terminal 30. In so doing, the present invention potentially enables a faster recovery of any failed transmissions associated with contention-based operations by speeding up the process necessary to enable retransmissions, e.g., RLC or MAC retransmissions, of any missing data packets In some circumstances, a user terminal 30 may transmit data packets on contention-based resources after sending a SR to the base station 20. If the transmission buffers are emptied by a CB transmission, the user terminal 30 may not have data to send when it receives the dedicated SG from the base station 20. The user terminal 30 is still required to transmit something on the dedicated resources. The user terminal 30 may, for example, transmit padding to the base station 20 on the dedicated resources. However, the uplink resource is essentially wasted in this case.

According to one embodiment, the user terminal 30 may implement a pro-active retransmission of an unacknowledged radio link control (RLC) packet when it has no data left in its transmission or retransmission buffer. The RLC layer is above the MAC layer where HARQ operations are performed. The RLC layer is responsible for segmentation of Packet Data Convergence Protocol (PDCP) packets into RLC packet data units (PDUs), which are passed to the MAC layer. In an acknowledged mode (AM), the RLC layer also implements a retransmission protocol to ensure error free delivery of data packets to higher layers. AM is typically used for TCP-based services where error-free data delivery is important.

When the user terminal 30 receives a SG and has no data in its transmission buffer, the user terminal 30 may, instead, retrieve data waiting to be acknowledged from the RLC transmission buffer and pro-actively retransmit the retrieved RLC PDUs. It will be appreciated that these pro-active retransmissions of RLC PDUs are not requested by the base station 20. To ensure that such unprompted pro-active retransmission do not interfere with normal RLC operations, the RLC retransmission counter should not be incremented when a pro-active retransmission is performed at the MAC level.

Figure 3:
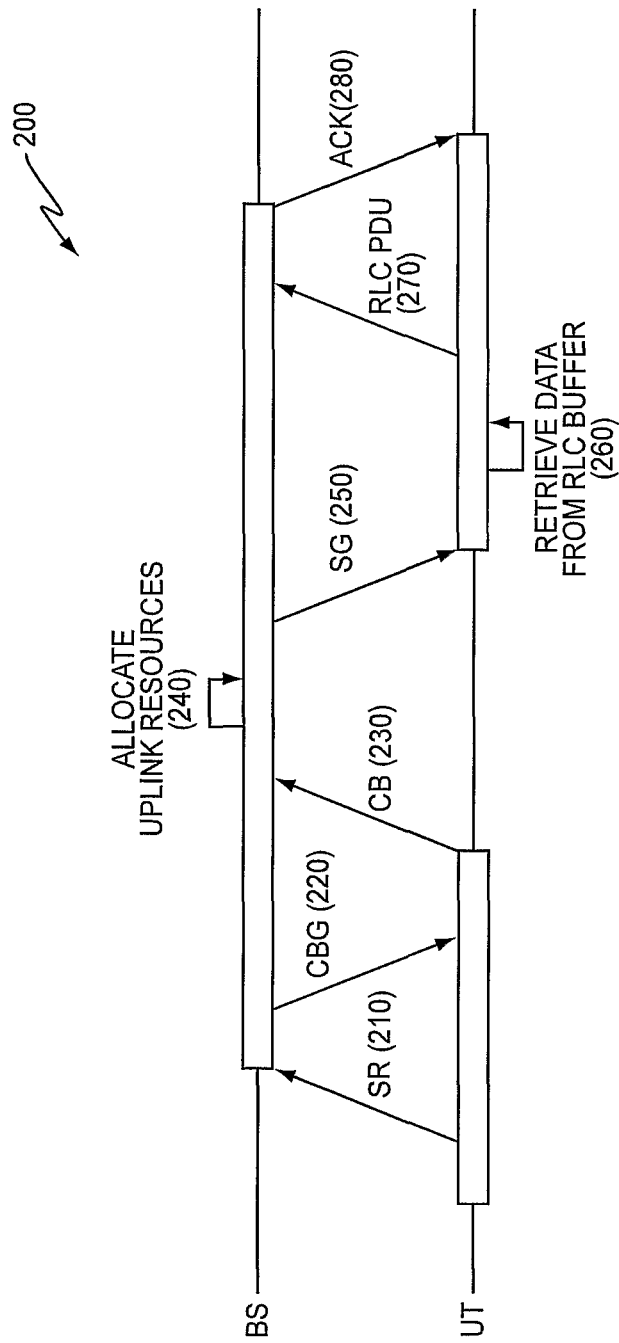
FIG. 3 illustrates one procedure for handling dedicated scheduling grant received after the transmission buffer has been emptied according to one exemplary embodiment of the invention.

FIG. 3 shows one exemplary pro-active retransmission process 200 according to the present invention. In the depicted scenario the user terminal 30 transmits an SR (210) to the base station 20 to request uplink resources and waits for a SG. While the user terminal 30 is waiting for the SG, the base station 20 sends a CBG to the user terminals 30 on the PDCCH as previously described (220). Because the user terminal 30 has data to send, it transmits data contained in its transmission buffer on the uplink resources (230) identified in the CBG. It is presumed in this example that the transmission buffer is emptied by the contention-based transmission. Although the user terminal 30 no longer has any MAC PDUs to send, the base station 20 allocates uplink resources to the user terminal 30 (240) and sends an SG to the user terminal 30 (250). Because the user terminal 30 no longer has any data in its transmission buffers, the user terminal 30 retrieves data packets from the RLC transmission buffer (260) that were already sent and are awaiting acknowledgement, and pro-actively retransmits the retrieved RLC data packets to the base station 20 on the dedicated resources allocated to the user terminal 30 by the SG (270). To ensure that the unprompted retransmission does not interfere with normal RLC operations, the user terminal 30 does not increment the RLC retransmission counter. The RLC entities at the base station 20 will delete any duplicate RLC PDUs. According to normal HARQ operations, the base station 20 will acknowledge the packets sent (280). However, the acknowledgement is only of the MAC layer packets containing the RLC PDU, and not of the RLC PDU.

Figure 4:
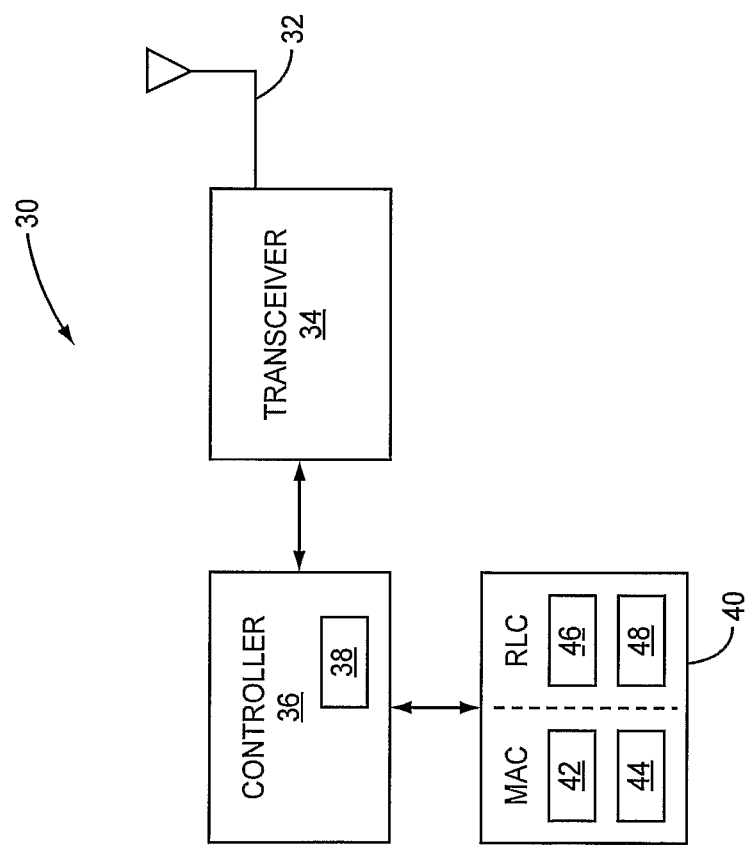
FIG. 4 illustrates a block diagram of a user terminal according to one exemplary embodiment of the invention.

FIG. 4 shows one exemplary user terminal 30 according to the present invention. User terminal 30 comprises antenna 32, transceiver 34, a controller 36, and buffer system 40. Transceiver 34 configured to transmit data packets to the base station and receive data packets from the base station via antenna 32. Controller 36 processes the signals transmitted and received by the user terminal 30 and controls the operation of user terminal 30, and particularly implements MAC and RLC layer protocols. In particular, the controller 36 performs physical layer processing such as coding/decoding, modulation/demodulation, etc. and implements higher layer protocols including MAC protocols and RLC protocols. The controller 36 may comprise one or more microprocessors, firmware, hardware, or a combination thereof. The buffer system 40 comprises memory for storing data to be transmitted or retransmitted. In the exemplary embodiment, the buffer system includes a MAC transmission and retransmission buffers 42, 44 for HARQ operations, as well as a RLC transmission and retransmission buffers 46, 48 for AM operations. The buffer system 40 may also contain the PDCP-level buffers, but for simplicity reasons, the PDCP-level buffers are left out of this example.

The controller 36 implements MAC layer and RLC layer protocols as herein described. In particular, the controller 36 implements MAC layer operations, such as generating and sending BSRs and SRs, maintaining MAC transmission and retransmission buffers 42, 44, processing received SGs or CBGs, and retrieving data from the transmission and retransmission buffers 40 for transmission on the scheduled resources. Controller 36 may also include a RLC retransmission counter 38 that tracks the number of retransmissions of RLC PDUs. The MAC transmission buffer 42 stores new data (e.g. transport blocks) waiting for transmission. After transmission on dedicated uplink resources, the transmitted data packets await acknowledgement by the base station 20. When the user terminal 30 receives a NACK for transmitted data packets, the data packets are put in the retransmission buffer 44 and the controller 36 resends the data packets. Because HARQ retransmission is not typically used for contention-based transmissions, data transmitted on CB resources does not typically await acknowledgement and is typically removed from the transmission buffer 42.

Similarly, the RLC transmission buffer 46 stores new RLC PDUs waiting for transmission. After transmission on uplink resources, the RLC PDUs are kept in the transmission buffer 46 while waiting for acknowledgement by the base station 20. When the user terminal 30 receives a NACK for a transmitted RLC PDU, the PDU is moved to the RLC retransmission buffer 48. The controller 36 increments the RLC counter 38 and resends the PDU in the retransmission buffer 48 unless the RLC counter 38 indicates the maximum number of retransmissions has been reached. Further, RLC PDUs stored in the RLC transmission buffer 46 awaiting acknowledgement can be retransmitted proactively in response to an SG from the base station 20 when there is no other data in the transmission buffers. In this case, the RLC counter is not incremented.

The contention-based access procedure described herein reduces the time it takes to access uplink resources and signaling overhead by allowing a synchronized user terminal 30 to send data on the uplink without first requesting resources for the transmission. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile station comprising:
   a transmission buffer configured to store one or more data packets intended to be transmitted to a network station;
   a receiver configured to receive, from the network station, a contention-based scheduling grant allocating contention-based resources for uplink transmission from the mobile station to the network station;
   a transmitter configured to transmit, responsive to the contention-based scheduling grant, one or more data packets contained in the transmission buffer on said contention-based resources, wherein if a buffer status report is pending, said transmitter is further configured to send the buffer status report with the transmitted data packets on the contention-based resources; and
   a controller configured to maintain the pending status of the buffer status report and a corresponding scheduling request when one or more data packets remain in the transmission buffer after the buffer status report is transmitted on the contention-based resources.

2. The mobile station of claim 1 wherein the buffer status report reflects the status of the transmission buffer after the data packets are removed from the transmission buffer for transmission.

3. The mobile station of claim 1 wherein the controller is further configured to cancel the pending status of the buffer status report and the corresponding scheduling request when no data packets remain in the transmission buffer.

4. The mobile station of claim 1 wherein the transmitter is further configured to subsequently transmit the scheduling request on an uplink control channel.

5. The mobile station of claim 1 wherein the transmitter transmits the buffer status report with the transmitted data packets by appending the buffer status report to at least one data packet before transmitting the data packet to the network station.

6. The mobile station of claim 1 wherein the receiver is further configured to receive, from the network station, a dedicated scheduling grant allocating dedicated resources for uplink transmission from the mobile station to the network station.

7. The mobile station of claim 6 wherein the transmission buffer comprises a new data transmission buffer configured to store data packets awaiting a first transmission to the network station, and wherein the transmitter is further configured to transmit, responsive to the dedicated scheduling grant, one or more data packets contained in the new data transmission buffer on said dedicated resources.

8. The mobile station of claim 6:
   wherein the transmission buffer comprises a retransmission buffer configured to store data packets awaiting retransmission to the network station; and
   wherein the transmitter is further configured to transmit, responsive to the dedicated scheduling grant, one or more data packets contained in the retransmission buffer on said dedicated resources.

9. The mobile station of claim 8 further comprising a retransmission counter configured to increment when the transmitter transmits data from the retransmission buffer on the dedicated resources.

10. The mobile station of claim 6:
   wherein the transmission buffer stores data packets in one protocol layer;
   wherein the transmitter is further configured to execute a pro-active retransmission by transmitting, responsive to said dedicated scheduling grant, one or more data packets awaiting acknowledgement from a higher protocol layer on said dedicated resources; and
   a retransmission counter configured to maintain a current value when the transmitter transmits the data packets from the higher protocol layer on the dedicated resources.

11. A method of transmitting data from a mobile station, the method comprising:
   receiving, from a network station, a contention-based scheduling grant allocating contention-based resources for uplink transmission from the mobile station to the network station;
   transmitting, responsive to the contention-based scheduling grant, one or more data packets contained in a transmission buffer on said contention-based resources;
   if a buffer status report is pending, transmitting the buffer status report with the transmitted data packets on the contention-based resources; and
   maintaining the pending status of the buffer status report and a corresponding scheduling request when one or more data packets remain in the transmission buffer after transmitting the buffer status report on the contention-based resources.

12. The method of claim 11 wherein the buffer status report reflects the status of the transmission buffer after the data packets are removed from the transmission buffer for transmission.

13. The method of claim 11 further comprising cancelling the pending status of the buffer status report and the corresponding scheduling request when no data packets remain in the transmission buffer.

14. The method of claim 11 further comprising subsequently transmitting the scheduling request on an uplink control channel.

15. The method of claim 11 wherein transmitting the buffer status report with the transmitted data packets comprises appending the buffer status report to at least one data packet before transmitting the data packet to the network station.

16. The method of claim 11 further comprising receiving, from the network station, a dedicated scheduling grant allocating dedicated resources for uplink transmission from the mobile station to the network station.

17. The method of claim 16 wherein the transmission buffer comprises a new data transmission buffer configured to store data packets awaiting a first transmission to the network station, the method further comprising transmitting, responsive to the dedicated scheduling grant, one or more data packets contained in the new data transmission buffer on said dedicated resources.

18. The method of claim 16 wherein the transmission buffer comprises a retransmission buffer configured to store data packets awaiting retransmission to the network station, the method further comprising:
   transmitting, responsive to the dedicated scheduling grant, one or more data packets contained in the retransmission buffer on said dedicated resources; and
   incrementing a retransmission counter after transmitting the data packets from the retransmission buffer on the dedicated resources.

19. The method of claim 16 further comprising implementing a pro-active retransmission when no data packets remain in the transmission buffer upon receipt of the dedicated scheduling grant by:
   transmitting, responsive to said dedicated scheduling grant, one or more data packets awaiting acknowledgement from a higher protocol layer on said dedicated resources; and
   maintaining a retransmission counter at a current value after transmitting the data packets from the higher protocol layer on the dedicated resources.

* * * * *